United States Patent
Kwak et al.

(10) Patent No.: US 10,602,155 B2
(45) Date of Patent: Mar. 24, 2020

(54) INTRA PREDICTION METHOD AND APPARATUS

(71) Applicant: INTELLECTUAL DISCOVERY CO., LTD., Seoul (KR)

(72) Inventors: Jae Hee Kwak, Anyang-si (KR); Ryeong Hee Gweon, Seoul (KR); Yung Lyul Lee, Seoul (KR); Sung Wook Hong, Seoul (KR); Jeong Pil Kim, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 551 days.

(21) Appl. No.: 14/787,604

(22) PCT Filed: Apr. 23, 2014

(86) PCT No.: PCT/KR2014/003559
§ 371 (c)(1),
(2) Date: Oct. 28, 2015

(87) PCT Pub. No.: WO2014/178563
PCT Pub. Date: Nov. 6, 2014

(65) Prior Publication Data
US 2016/0080745 A1  Mar. 17, 2016

(30) Foreign Application Priority Data

Apr. 29, 2013 (KR) .................... 10-2013-0047143
Apr. 29, 2013 (KR) .................... 10-2013-0047145
(Continued)

(51) Int. Cl.
*H04N 19/159* (2014.01)
*H04N 19/117* (2014.01)
(Continued)

(52) U.S. Cl.
CPC ......... *H04N 19/159* (2014.11); *H04N 19/117* (2014.11); *H04N 19/14* (2014.11);
(Continued)

(58) Field of Classification Search
CPC ...... H04N 19/159; H04N 19/46; H04N 19/14; H04N 19/593; H04N 19/59; H04N 19/82;
(Continued)

(56) References Cited

U.S. PATENT DOCUMENTS

| 2012/0069906 A1 | 3/2012 | Sato |
| 2012/0140821 A1* | 6/2012 | Drugeon ............ H04N 19/105 375/240.12 |

(Continued)

FOREIGN PATENT DOCUMENTS

| KR | 10-2011-0113592 A | 10/2011 |
| KR | 10-2012-0118782 A | 10/2012 |

(Continued)

OTHER PUBLICATIONS

International Search Report dated Jul. 28, 2014 in counterpart International Application No. PCT/KR2014/003559 (5 pages, with English translation).

(Continued)

*Primary Examiner* — James M Pontius
(74) *Attorney, Agent, or Firm* — NSIP Law

(57) ABSTRACT

A method for performing an intra prediction according to the present invention may comprise the steps of: generating predicted pixels by performing interpolation using N reference pixels including two adjacent reference pixels according to an intra prediction direction; and generating a residual signal by using the generated predicted pixels. Accordingly, when a prediction for generating the residual signal is performed according to each prediction direction (mode), an optimal filtering method is determined and a predicted value (Continued)

is acquired, so that a size of the residual signal can be minimized and compression performance can be improved.

15 Claims, 15 Drawing Sheets

(30) Foreign Application Priority Data

| | | |
|---|---|---|
| Apr. 29, 2013 | (KR) | 10-2013-0047149 |
| Apr. 29, 2013 | (KR) | 10-2013-0047151 |

(51) Int. Cl.
| | |
|---|---|
| *H04N 19/82* | (2014.01) |
| *H04N 19/59* | (2014.01) |
| *H04N 19/593* | (2014.01) |
| *H04N 19/14* | (2014.01) |
| *H04N 19/46* | (2014.01) |
| *H04N 19/182* | (2014.01) |
| *H04N 19/61* | (2014.01) |
| *H04N 19/625* | (2014.01) |

(52) U.S. Cl.
CPC ........... *H04N 19/182* (2014.11); *H04N 19/46* (2014.11); *H04N 19/59* (2014.11); *H04N 19/593* (2014.11); *H04N 19/61* (2014.11); *H04N 19/625* (2014.11); *H04N 19/82* (2014.11)

(58) Field of Classification Search
CPC .... H04N 19/625; H04N 19/61; H04N 19/182; H04N 19/117
See application file for complete search history.

(56) References Cited

U.S. PATENT DOCUMENTS

| | | | |
|---|---|---|---|
| 2012/0170650 A1 | 7/2012 | Chong et al. | |
| 2013/0101032 A1 | 4/2013 | Wittmann et al. | |
| 2013/0243091 A1* | 9/2013 | Ye | H04N 19/176 375/240.16 |
| 2013/0272623 A1* | 10/2013 | Jeon | H04N 19/00 382/238 |
| 2014/0133565 A1* | 5/2014 | Lee | H04N 19/593 375/240.14 |

FOREIGN PATENT DOCUMENTS

| | | |
|---|---|---|
| KR | 10-2012-0140181 A | 12/2012 |
| KR | 10-2013-0002297 A | 1/2013 |

OTHER PUBLICATIONS

International Telecommunication Union, ITU-T Telecommunication Standardization Sector of ITU, H.264, Series H: Audiovisual and Multimedia Systems, Infrastructure of audiovisual services—Coding of moving video, Advanced video coding for generic audiovisual services, Jan. 2012, (680 pages in English).

* cited by examiner

INTRA PREDICTION METHOD AND APPARATUS

CROSS-REFERENCE TO RELATED APPLICATIONS

This application is a U.S. National Stage Application of International Application No. PCT/KR2014/003559, filed on Apr. 23, 2014, which claims the benefit under 35 USC 119(a) and 365(b) of Korean Patent Application No. 10-2013-0047143, filed on Apr. 29, 2013, Korean Patent Application No. 10-2013-0047145, filed on Apr. 29, 2013, Korean Patent Application No. 10-2013-0047149, filed on Apr. 29, 2013, and Korean Patent Application No. 10-2013-0047151, filed on Apr. 29, 2013 in the Korean Intellectual Property Office.

BACKGROUND OF THE INVENTION

Field of the Invention

The present invention relates to a method and apparatus of video encoding/decoding, and more particularly, to a method that performs intra prediction by using interpolation filtering while encoding and decoding.

Discussion of the Related Art

In general, a residual signal is generated by using intra prediction and inter prediction while video coding. The reason for acquiring the residual signal is that when the residual signal is coded with the residual signal, the quantity of data is small and a data compression rate increases and as the prediction is better, a signal of the residual signal is small.

In an intra prediction method, data of a current block is predicted by using contiguous pixels of the current block. A difference between an actual value and a prediction value is referred to as a residual signal block. In the case of HEVC, in the intra prediction method, 9 prediction modes used in the existing H.264/AVC increases to 35 predictions modes as illustrated in FIG. 1 to be more subdivided, and as a result, the prediction is performed (however, a planar prediction mode and a DC prediction mode are not shown in FIG. 1).

In the case of the inter prediction method, the current block is compared with blocks in contiguous pictures to find a most similar block. In this case, positional information (Vx, Vy) of the found block is referred to as a motion vector. A difference of pixels in the block between the current block and the prediction block predicted by the motion vector is referred to as the residual signal block (motion-compensated residual block).

As described above, a video encoding and decoding method is required, in which the intra prediction and the inter prediction are subdivided to decrease the quantity of data of the residual signal and a calculation quantity is small without degradation of codec performance by using efficient transform.

SUMMARY OF THE INVENTION

An object of the present invention is to provide a video encoding and decoding method having good performance with a small calculation amount during a transform coding process of video codec and an apparatus therefor.

However, technical objects which embodiments of the present invention intend to achieve are not limited the aforementioned technical object and other technical objects may be present.

In accordance with an embodiment of the present invention, a method for performing an intra prediction, includes: generating a prediction pixel by performing interpolation with N reference pixels including two contiguous reference pixels according to an intra prediction direction; and generating a residual signal by using the generated prediction pixel.

In the generating of the prediction pixel, discrete cosine transform (DCT) or discrete sine transform (DST)-based filtering having the number of tabs corresponding to the number of the reference pixels may be used.

At least one of the type of the filtering and the number of tabs may be transferred from an encoding apparatus to a decoding apparatus.

The number of tabs of the filtering may be decided based on mode information corresponding to the intra prediction direction.

In the case where the reference pixels are arranged in a vertical direction and the case where the reference pixels are arranged in a horizontal direction, the number of tabs of the filtering may be decided to be different.

The N may be equal to or more than 4.

In the generating of the prediction pixel by performing the interpolation, sync interpolation filtering may be performed.

The intra prediction method may further include: verifying edge information of a video; and deciding the number of tabs of filtering based on the verified edge information.

When an edge is present between the two contiguous pixels, the number of tabs of the filtering may be decided to be smaller than that when the edge is not present between the two contiguous pixels.

When more edges are present in a horizontal direction than in a vertical direction, the number of horizontal filtering tabs may be decided to be larger than the number of vertical filtering tabs.

The intra prediction method may further include spitting a video to be predicted into a plurality of regions to decide the number N of filtering tabs applied to each of the plurality of regions, wherein in the generating of the prediction pixel by performing the interpolation, the interpolation is performed for each of the split regions.

The number N of filtering tabs may be decided according to at least one of the position of an object in the video, a change in pixel value of a specific region, and a change in pixel value of a contiguous region.

The number of filtering tabs may be differently applied to a first region corresponding to the position of the object and a remaining second region.

The number of filtering tabs may be differently applied to any one of the plurality of split regions in the vertical direction and the horizontal direction.

According to the present invention, when a prediction for generating the residual signal is performed according to each prediction direction (mode), a prediction value is acquired by using an optimal filtering method to minimize the intensity of the residual signal, thereby improving compression performance.

Further, when interpolation is performed in a prediction according to various directions adopted in the intra prediction method, the number of filtering tabs used for the interpolation varies for each region through a change in specific region or a pixel change in a video to improve encoding performance.

DETAILED DESCRIPTION OF THE EMBODIMENTS

Figure 1:
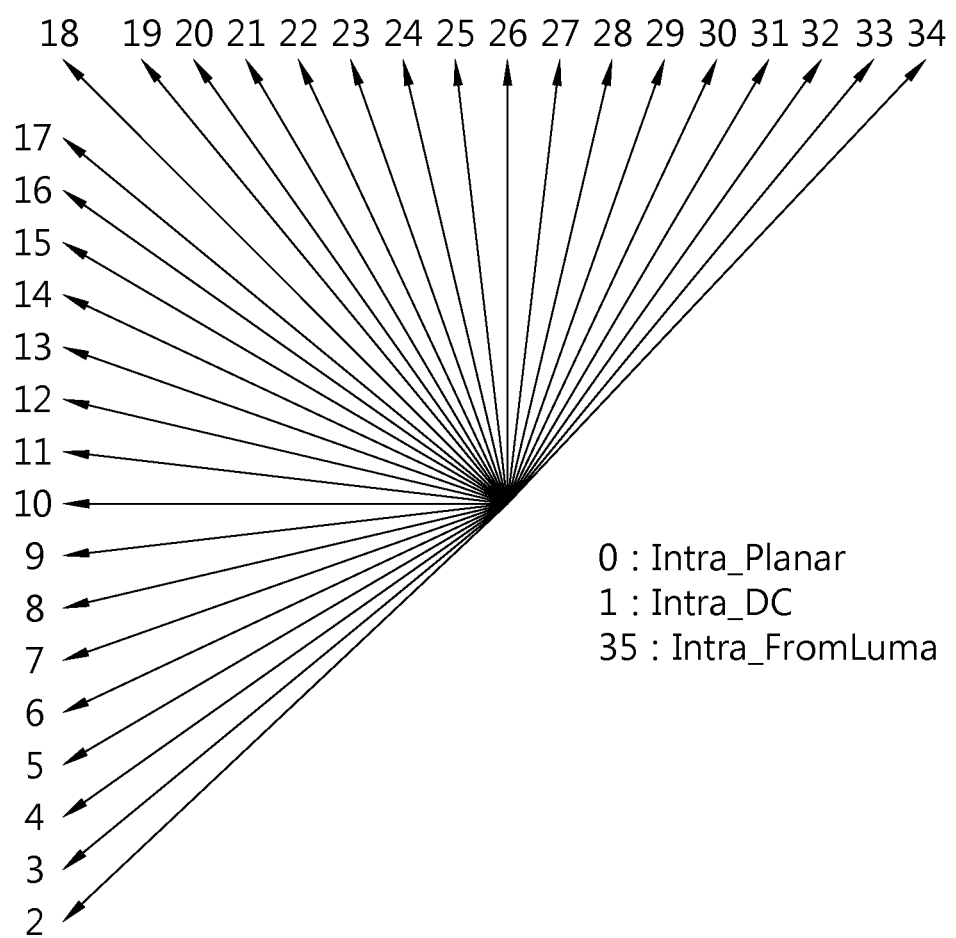
FIG. 1 is a diagram illustrating examples of intra prediction modes.

Hereinafter, embodiments of the present invention will be described so as to be easily implemented by those skilled in the art, with reference to the accompanying drawings. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element.

Throughout this specification, when it is described that a member is positioned on another member, the member may "contact" the other member or a third member may be interposed between both members.

In the specification, unless explicitly described to the contrary, the word "comprise" and variations such as "comprises" or "comprising", will be understood to imply the inclusion of stated elements but not the exclusion of any other elements. "Approximately", "substantially", and the like which are terms of a degree used throughout the specification of the present invention are used, when unique manufacturing and material tolerances are presented as mentioned meanings, as "in the numerical value" or "close to the numerical value" and are used to prevent disclosed contents in which accurate or absolute numerical values are mentioned in order to assist understanding the present invention from being wrongly used by an unscrupulous pirate. "Step (which)" or "step of" which is a term of a degree used throughout the specification of the present invention does not mean "step for".

Throughout the specification of the present invention, a term of a combination of elements included in a Markush form expression means one or more mixtures or combinations selected from a group consisting of components disclosed in the Markush form expression and means including one or more selected from the group consisting of the components.

As an example of encoding the actual video and the depth information map thereof, encoding may be performed by using high efficiency video coding (HEVC) which is jointly standardized in MPEG (Moving Picture Experts Group) and VCEG (Video Coding Experts Group) having highest encoding efficiency among video encoding standards developed up to now.

The present invention relates to an intra prediction method in a method and an apparatus of video encoding/decoding and when a prediction for generating a residual signal is performed according to each prediction direction (mode) during an intra prediction for each direction performed while video encoding/decoding, a prediction is acquired by deciding an optimal filtering method in order to acquire an accurate prediction value to minimize the intensity of the residual signal, thereby improving compression performance.

In detail, the present invention is a method in which in a prediction according to various directions adopted in the intra prediction method, when the prediction for generating the residual signal is performed according to each prediction direction (mode), an accurate prediction value is acquired by applying DCT based or sync function based filtering in order to acquire the accurate prediction value, thereby improving the compression performance.

Figure 2:
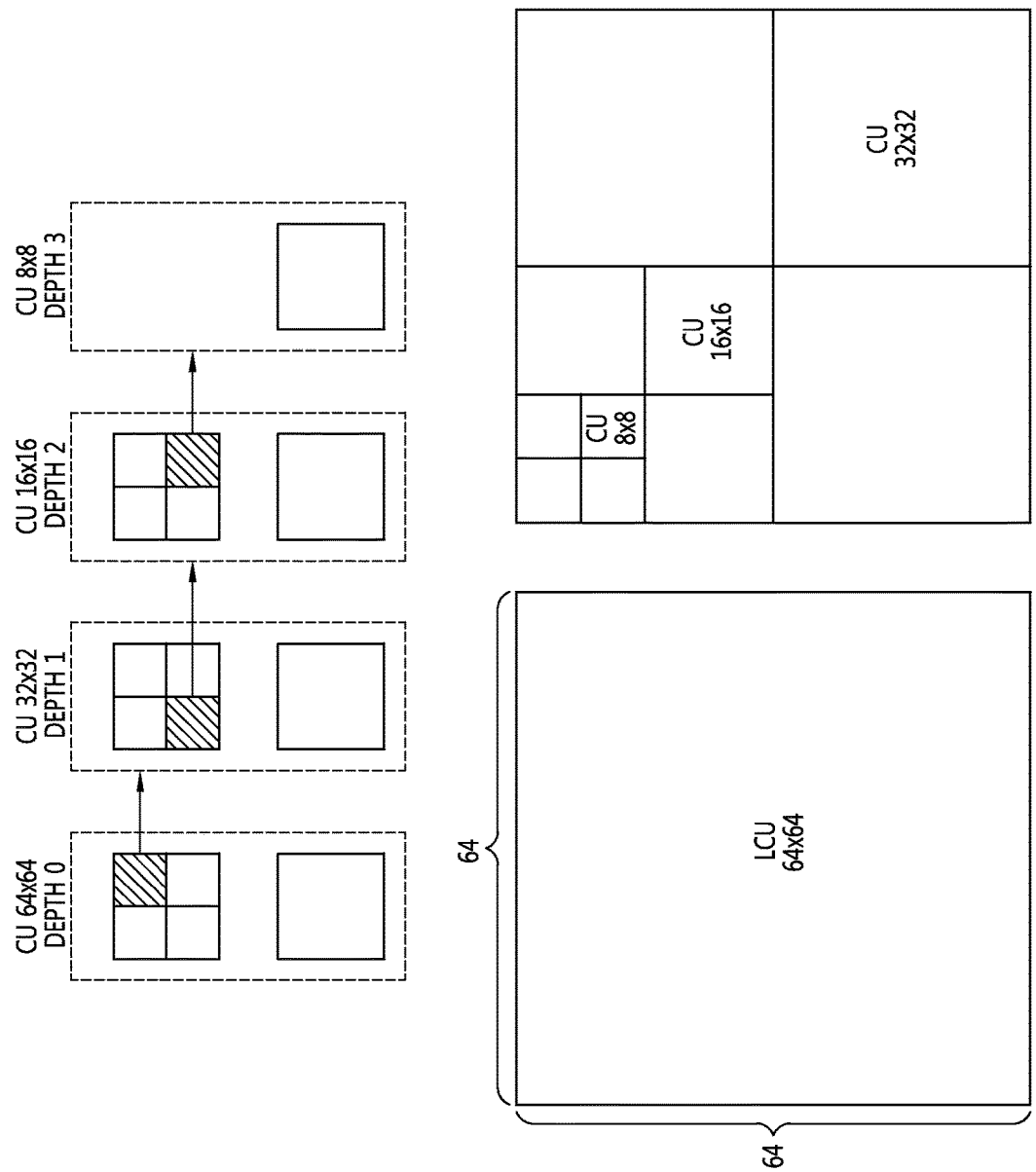
FIG. 2 is a diagram for describing one example of video encoding units.

FIG. 2 is a diagram for describing one example of video encoding units.

In the HEVC, a coding tree block (CTB) is used as a moving picture encoding unit and in this case, the CTB is defined as various square shapes. The CTB is referred to as a coding unit (CU).

Referring to FIG. 2, the coding unit (CU) has a shape of a quad tree and when a largest coding unit has a size of 64×64, the encoding is performed by recursively finding an optimal prediction unit until a depth is 3 by setting the depth to 0, that is, up to a coding unit (CU) having a size of 8×8.

Whether the coding unit is split according to predetermined flag information may be decided. For example, whether a lower coding unit is split may be decided according to flag information such as split_coding_unit_flag.

Referring to FIG. 2, when a flag value such as split_coding_unit_flag is 1, the coding unit is recursively split into lower coding and when split_coding_unit_flag is 0, the coding unit may be used as a prediction unit without additional splitting.

The prediction unit to perform the prediction is defined as a prediction unit (PU) and a prediction of units of which each coding unit (CU) is split into multiple blocks is performed and the prediction is performed by dividing the blocks into square and rectangular shapes.

According to an HEVC standard provided to encode/decode moving picture data, a transform method of transform units having various sizes is used as a method for decreasing a spatial correlation of the residual signal in the block and increasing a compression rate of energy after performing an inter prediction/intra prediction. A signal transformed according to the transform unit is finally generated as a bitstream through entropy coding.

Meanwhile, the intra prediction considers a total of 34 directionalities and is applied to all of square PUs of 4×4 which is a minimum prediction unit to 64×64 which is a maximum prediction unit. A prediction value of a block boundary used in each prediction generates a ½₃₂ linear interpolation prediction pixel is generated compared with a distance between two pixels for the prediction according to each direction and since this considers only values of two pixels, a prediction sample has a problem that a variation of various pixels which are edges of a boundary block is not completely considered.

In the present specification, a prediction pixel of a prediction target block, that is, the prediction sample may be generated through interpolation of reference pixels. Therefore, the interpolation may mean generation of the prediction sample.

In particular, in the case of a pixel in which the video is drastically changed and a pixel positioned at a boundary of an object, a prediction method using two pixels is lower in efficiency than the existing method.

Figure 3:
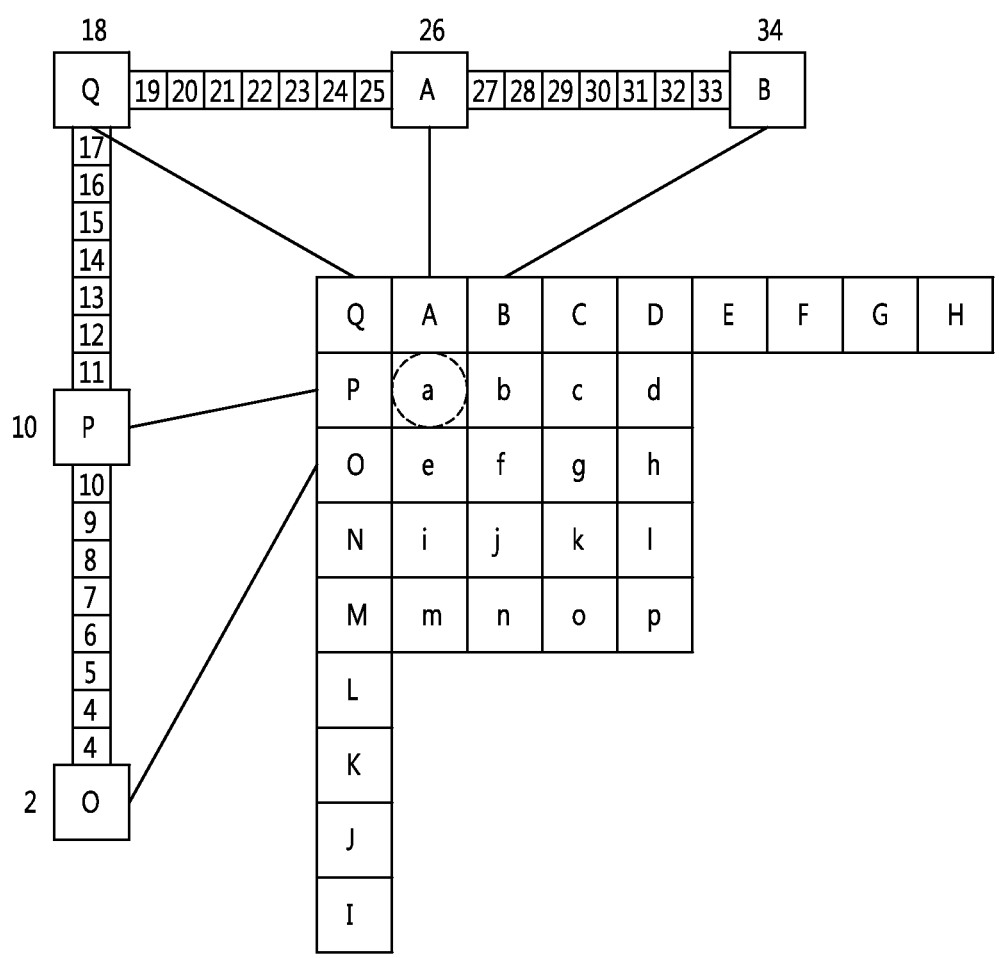
FIG. 3 is a diagram illustrating one example of an interpolation method performed an intra prediction.

FIG. 3 illustrates one example of an interpolation method performed for the intra prediction and illustrates a method that predicts a pixel for prediction modes #2 to 34 having directionality among 34 prediction methods.

Referring to FIG. 3, a direction is positioned between a left restoration pixel and an upper restoration pixel according to respective directions and the prediction pixel is generated by using values of two pixels with respect to a value of a position applied to the direction.

For example, in mode #32, a prediction for the a pixel may be performed through calculation of a weighted value depending on a distance with respect to A and B pixels. In this case, since the prediction is performed through two pixels, it is not efficient at a boundary where a value of the video is rapidly changed.

According to the embodiment of the present invention, in a prediction according to various directions adopted in the intra prediction method, when the prediction for generating the residual signal is performed according to each prediction direction (mode), an accurate prediction value is acquired by applying DCT-IF filtering in order to acquire the accurate prediction value, thereby improving the compression performance.

Figure 4:
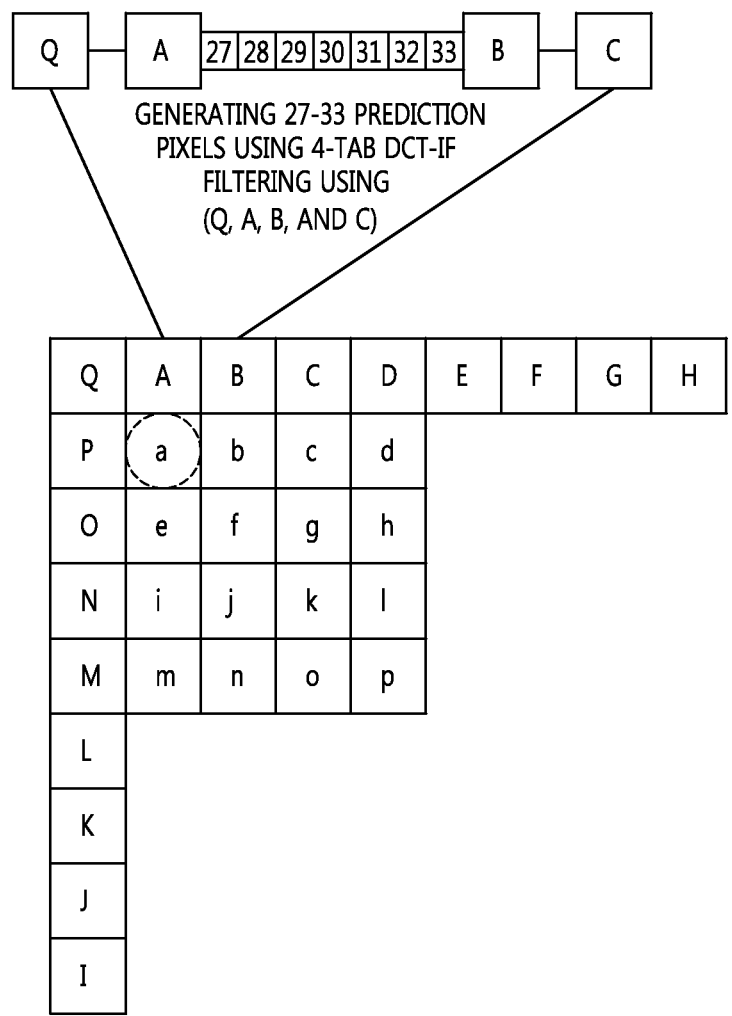
FIG. 4 is a diagram for describing a first embodiment of an intra prediction method according to the present invention.

In order to solve the problem, the prediction pixel may be generated through DCT-based filtering by using four contiguous pixels, for example, Q, A, B, and C pixels as illustrated in FIG. 4.

For example, a DCT-based filtering coefficient may be expressed by using type-2 DCT illustrated in Equation 1 given below.

In this case, first, DCT is performed and a coefficient f(x) according to each position is generated through inverse transform of the DCT. Referring to a case illustrated in FIG. 4, f(0)=Q, f(1)=A, f(2)=B, f(3)=C, and N=4.

[Equation 1]

$$F(u) = \alpha(u) \sum_{x=0}^{N-1} f(x) \cos \frac{\pi(2x+1)u}{2N} \quad (1)$$

$$f(x) = \sum_{u=0}^{N-1} \alpha(u) F(u) \cos \frac{\pi(2x+1)u}{2N} \quad (2)$$

where $$\alpha(0) = \frac{1}{\sqrt{N}}, \alpha(k) = \sqrt{\frac{2}{N}}, k = 1, \ldots, N-1$$

N: The number of samples (if N=4, 4-point inverse DCT f(x))

If N=4 (that is, when 4-point DCT and IDCT are used), in the case of prediction mode #30 in FIG. 4, x=1+½ (=N/2+½), and as a result, an interpolation value of a 1+½ sample position may be generated by using formula (2) of Equation 1. Meanwhile, in the case of prediction mode #29 in FIG. 4, x=1+¹³⁄₃₂ (=N/2+¹³⁄₃₂), and as a result, an interpolation value of a 1+¹³⁄₃₂ sample position may be generated by using formula (2) of Equation 1.

In addition, in the case of prediction mode #32 in FIG. 4, x=1+²⁶⁄₃₂(=N/2+²⁶⁄₃₂), and as a result, an interpolation value of a 1+²⁶⁄₃₂ sample position may be generated by using formula (2) of Equation 1.

Meanwhile, the number of filter tabs used in the DTC based interpolation may be set to various numbers in addition to 4 and the number of tabs may be signaled by a decoder or decided through peripheral information (e.g., edge information or mode information).

In the example of the present invention, type-2 DCT and inverse DCT (IDCT) are used, but another type DCT and IDCT may also be used and the example of the present invention includes all methods that are usable various other types of discrete sine transform (DST) and IDST pairs.

Figure 5:
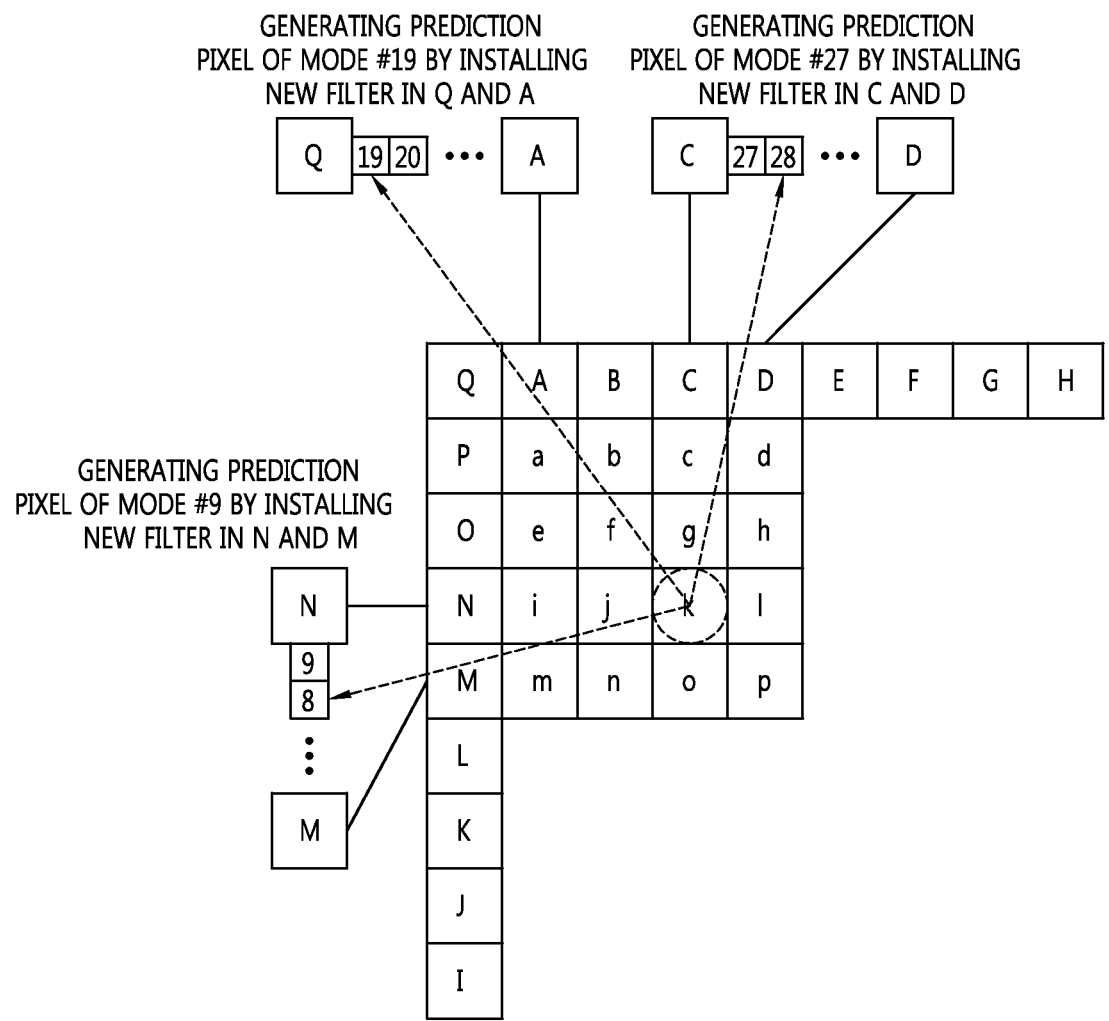
FIG. 5 is a diagram for describing a second embodiment of the intra prediction method according to the present invention.

FIG. 5 illustrates an example of generation of a prediction pixel in three directional modes to predict k with respect to the prediction mode regarding the prediction direction.

Referring to FIG. 5, in the case of a value applied to a specific intra prediction mode, when the value does not exist in an accurate direction, the prediction pixel may be generated through a linear filtering method by using values of two pixels at both sides.

For example, in the case of mode #28 of k, a prediction of mode #28 is performed through the calculation of the weighted value depending on the distance with respect to C and D pixels. In the case of mode #19, Q and A are similarly applied and in the case of mode #8, M and N are similarly applied to decide the prediction pixel of k.

Since the prediction is performed through only two pixels at both sides as described above, it is not efficient at the boundary where the value of the video is rapidly changed. In order to solve the problem, the prediction pixel may be generated through the DCT-based filtering by using four contiguous pixels like (B,C,D,E) and (L,M,N,O).

Figure 6:
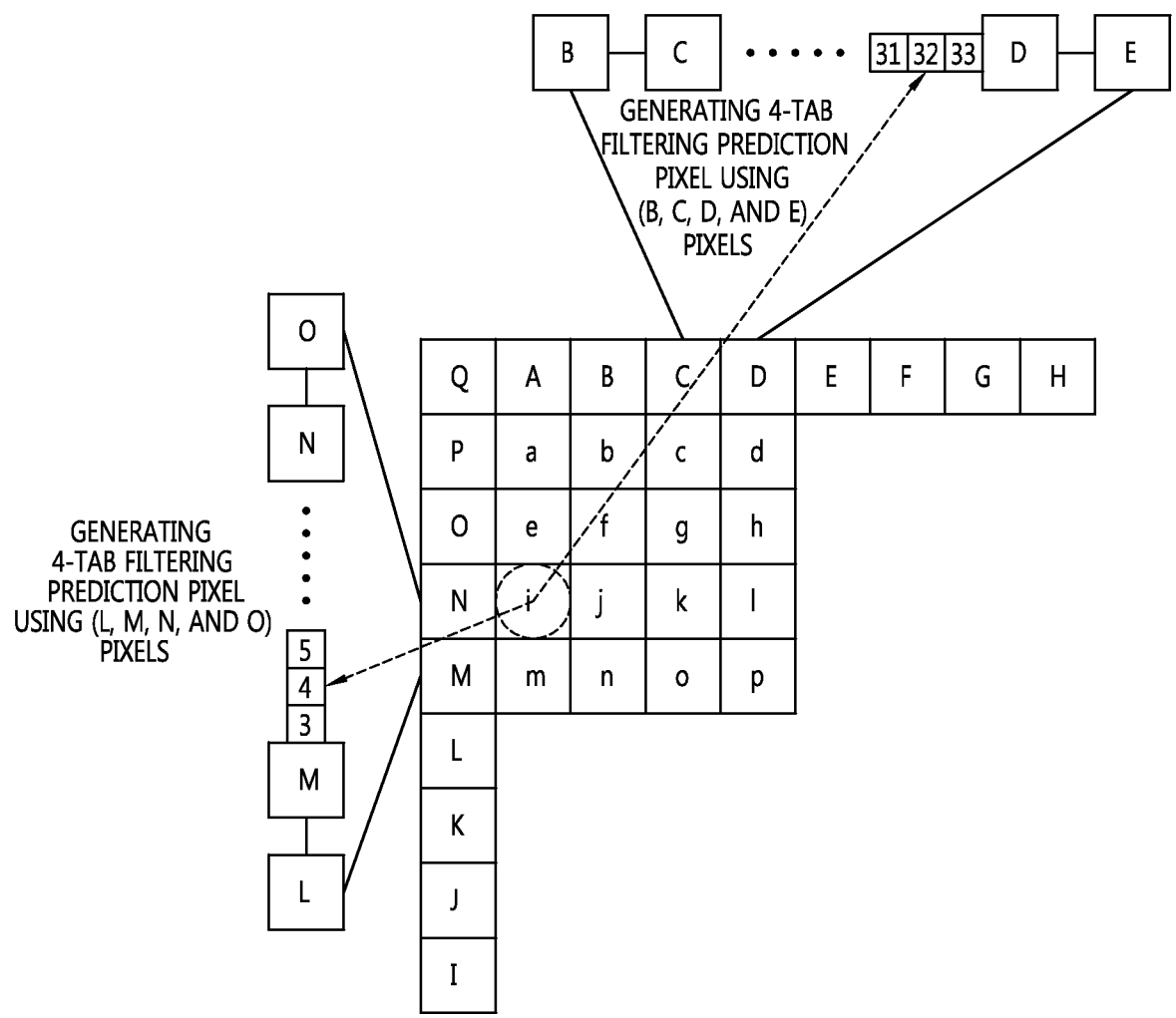
FIG. 6 is a diagram for describing a third embodiment of the intra prediction method according to the present invention.

FIG. 6 illustrates one example of a method for generating the prediction pixel by using a 4-tabe DCT-IF filtering.

Referring to FIG. 6, examples of two pixel predictions of generating a mode #4 prediction pixel between A and B by using four pixels of Q, A, B, and C and generating a mode #4 prediction pixel between C and D by using four pixels L, M, N, and O in the case of a #4-direction mode prediction and a #32-direction mode prediction of I by using a 4-tab DCT-IF filter and herein, the filtering method is a method using the 4-tab DCT-IF filter.

Herein, the number of tabs may be transformed to an N-tab size in addition to 4 and the size of the tab may be signaled by the decoder or decided through the peripheral information (edge information, mode information, and the like).

Figure 7:
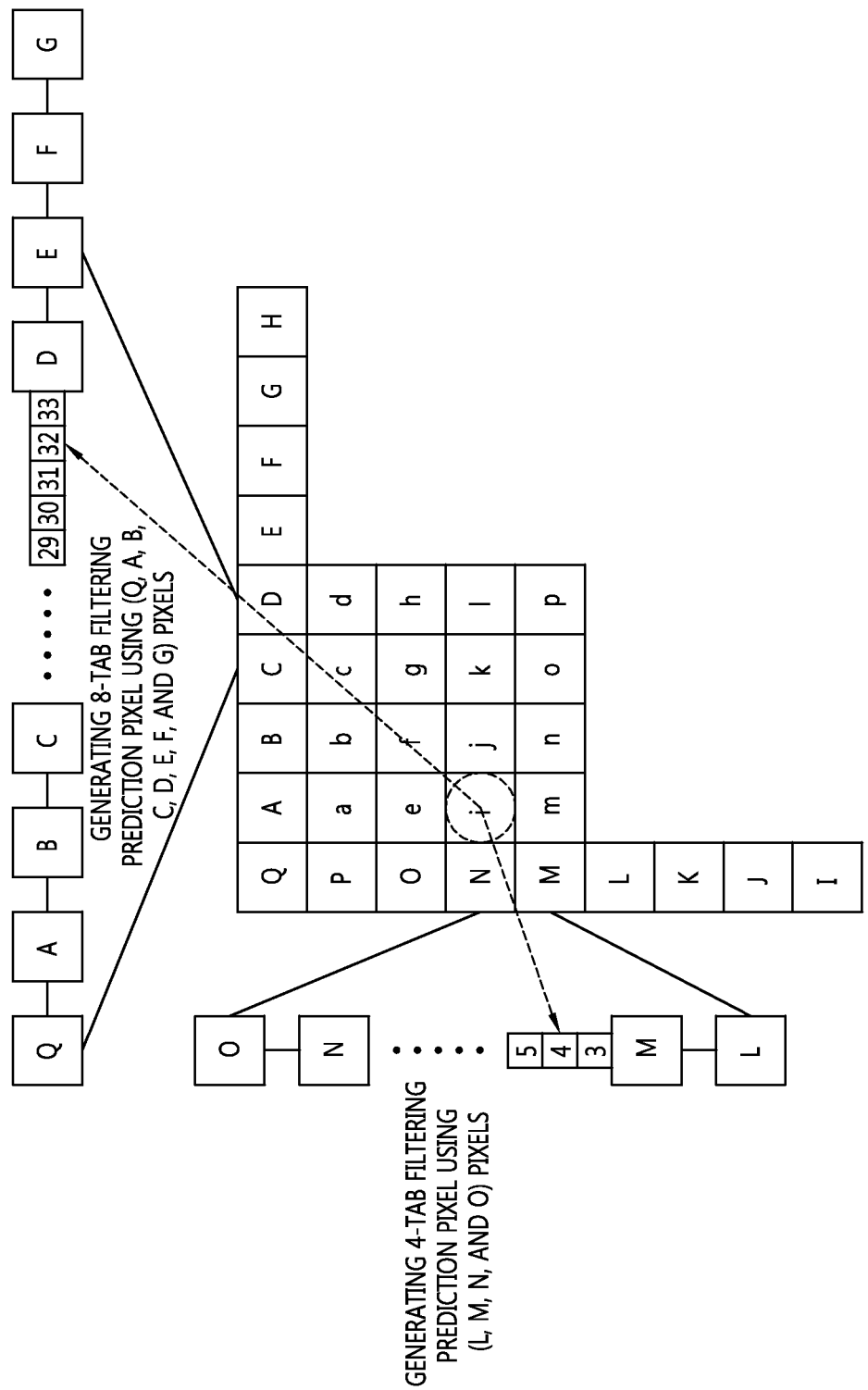
FIG. 7 is a diagram for describing a fourth embodiment of the intra prediction method according to the present invention.

FIG. 7 as a diagram for desiring one example of a method for performing the intra prediction by using filters having the different number of tabs with respect to a horizontal direction and a vertical direction illustrates a method for generating the prediction pixel by using 8-tab DCT-IF filtering with respect to the horizontal direction and 4-tab DCT-IF filtering with respect to the vertical direction.

In the case of FIG. 7, the number of tabs may be differently decided as if using 8-tabe filtering at an upper end and 4-tab filtering at a left side and as the N-tab, all of various tabs may be available.

As illustrated in FIG. 7, an example is illustrated, in which when left mode #4 is performed at the time of performing the prediction of the pixel, the prediction pixel is positioned between M and N and the prediction pixel corresponding to the prediction pixel of mode #4 may be predicted through the 4-tab DCT-IF filtering and when the prediction mode of the pixel positioned at i is the #32-direction mode, the prediction may be performed through the value of the prediction pixel through the upper 8-tab DCT-IF filtering.

Further, the filter related information includes both an available method without signaling through the peripheral information or a method that can decode a filtering pixel by differentiating the number of tabs through the signaling.

Since the generated interpolation coefficient value is configured by a decimal point, interpolation filtering coefficient values bilaterally symmetric to each other, which are normalized to integral values may be obtained.

Table 1 given below shows one example for interpolation coefficient values according to the intra prediction method of 4-point (4-tab) filtering.

Meanwhile, when the prediction pixel is brought at the upper end, in the case where there is an edge between two pixels positioned at the upper end (for example, the case where a change of a value is large), it may be effective to use the small number of filtering tabs.

On the contrary, in the case where there is no edge (for example, the case where the change of the value is small), it may be effective to use the large number of filtering tabs so as to be significantly influenced by the contiguous pixels and this may be similarly applied to both predictions of the pixel values at the upper end and the left side.

That is, a method that increases or decreases the number of tabs according to a change (for example, the edge information or the sizes of the pixels) of the contiguous pixels is adaptively applied to generate the accurate prediction pixel, thereby improving whole encoding/decoding performance.

According to another embodiment of the present invention, in the prediction according to various directions adopted in the intra prediction method, when the prediction for generating the residual signal is performed according to each prediction direction (mode), the accurate prediction value is acquired through the interpolation by applying the

TABLE 1

| 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|
| −1 | −2 | −3 | −3 | −4 | −5 | −5 | −6 | −6 | −6 | −6 | −7 | −7 | −7 | −7 | −8 | −8 | −8 | −6 | −5 | −5 | −5 | −4 | −3 | −3 | −2 | −2 | −2 | −1 | −1 | 0 |
| 63 | 63 | 62 | 61 | 60 | 58 | 57 | 55 | 54 | 52 | 50 | 43 | 46 | 43 | 41 | 38 | 36 | 14 | 31 | 28 | 25 | 23 | 20 | 18 | 15 | 13 | 10 | 8 | 6 | 4 | 2 |
| 2 | 4 | 6 | 8 | 10 | 13 | 15 | 18 | 20 | 23 | 25 | 28 | 31 | 34 | 36 | 38 | 41 | 43 | 46 | 48 | 50 | 52 | 54 | 55 | 57 | 58 | 60 | 61 | 62 | 62 | 63 |
| 0 | −1 | −1 | −2 | −2 | −2 | −3 | −3 | −4 | −5 | −5 | −5 | −6 | −6 | −6 | −6 | −7 | −7 | −7 | −7 | −6 | −6 | −6 | −6 | −5 | −5 | −4 | −3 | −3 | −2 | −1 |

For example, when the #32 prediction mode is decided for the prediction pixel of a in FIG. 4, a value of a location may be calculated as shown in Equation 2 by applying the filtering coefficient value of the above table.

[Equation 2]

$$a' = (Q+(-1)+A+(4)+B+(63)+C+(-2)) >> 6;$$

As described above, when the prediction pixel is generated through the coefficient of the DCT-based interpolation for each location of each mode, this method may generate a more accurate prediction pixel than generating the prediction pixel for each location by considering only two contiguous pixels.

Herein, the DCT-based interpolation filter shows one example and includes all methods which may selectively adopt various filtering.

Provided are a method and an apparatus of moving picture encoding/decoding, which generate the residual signal considering a change of a contiguous video through filtering using various contiguous restoration signal used for each prediction through a filtering method that brings about improvement of performance to increase the compression rate.

In the above example, the method is described as an example, which derives the interpolation filter coefficient from the case of N=4 and uses the derived coefficient as the prediction sample, but the interpolation filter may be derived and used even in all cases of N=2n, n=1, 2, 3, 4, . . . .

Further, in this example, the type-2 DCT and inverse DCT (IDCT) are used, but another type DCT and IDCT may also be used and even though various other types of discrete sine transform (DST) and IDST pairs are used, the improvement of the performance may be caused.

sync filtering in order to acquire the accurate prediction value, thereby improving the compression performance.

For example, in the intra prediction method described with reference to FIGS. 4 to 7, the interpolation is performed by using the sync filter instead of the DCT-based filter or in addition to the DCT-based filter to generate the prediction pixel.

Figure 8:
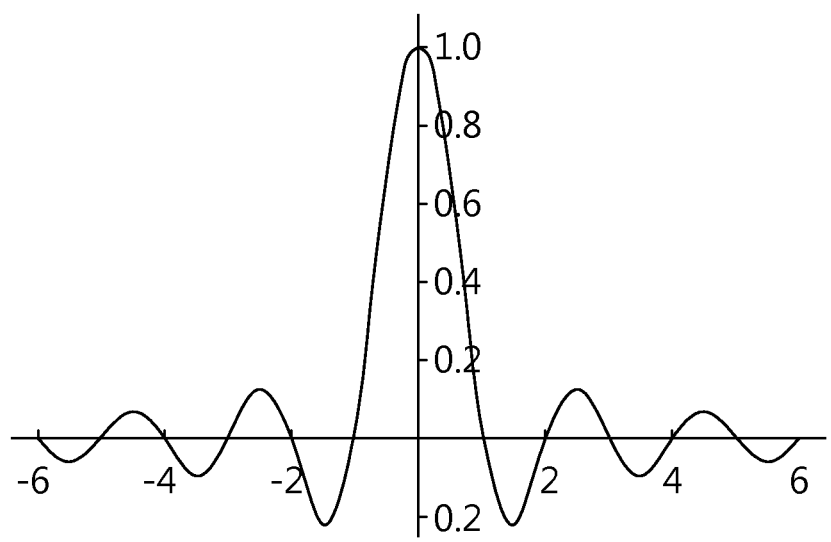
FIGS. 8 and 9 are diagrams for describing one example of sync filtering.
Figure 9:
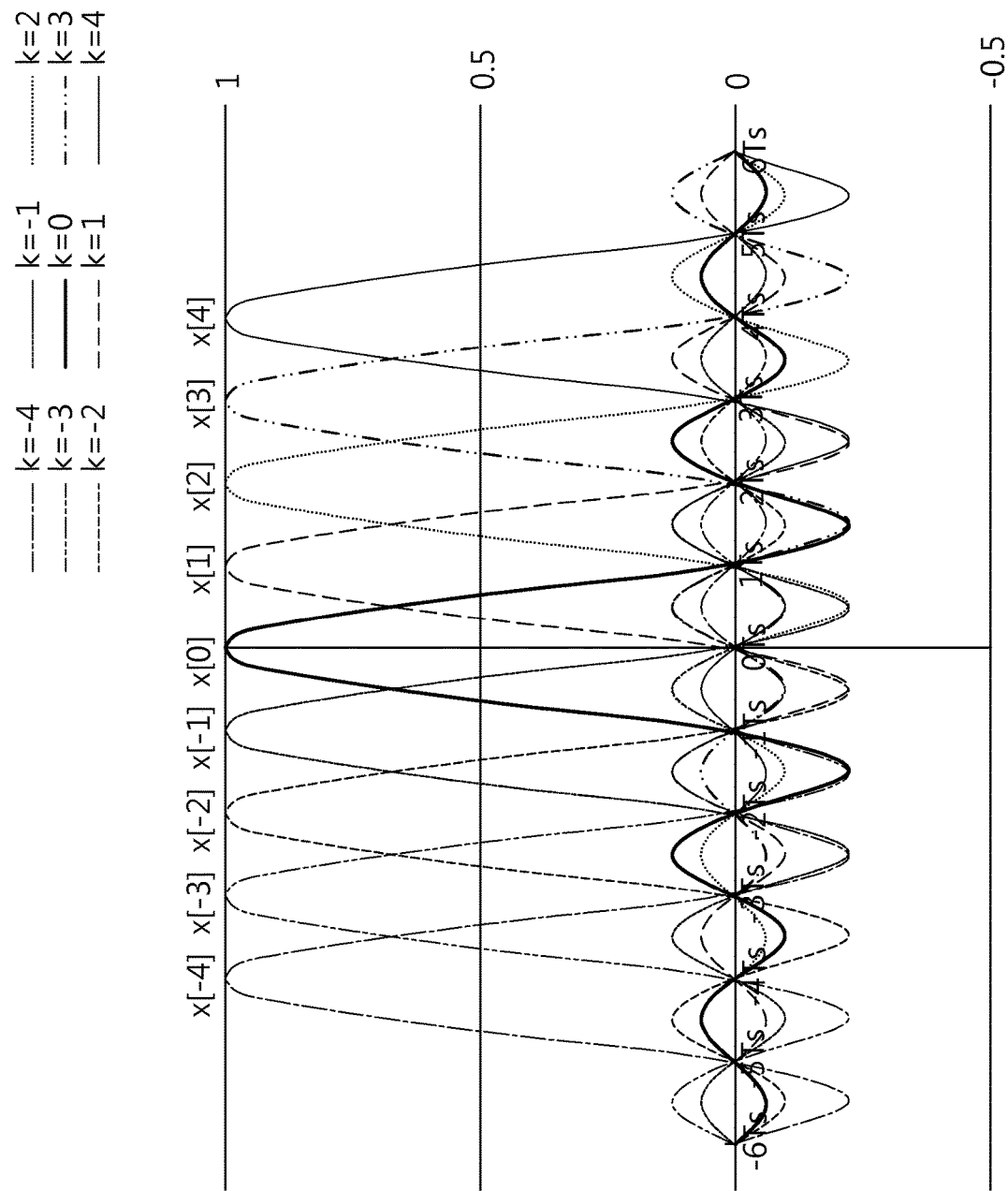

FIGS. 8 and 9 are diagrams for describing one example of sync filtering.

FIG. 8 illustrates a normalized sync function, and a coefficient of respective four-tabs may be calculated by the sync function illustrated in FIG. 8.

Interpolation is performed therethrough, and then each prediction pixel may be calculated according to the same method as described with reference to FIGS. 4 to 7. Further, all of methods which are applicable by four-tabs and N-tabs may be included.

All videos viewed through the current video apparatus are values which are converted from an analog signal to a digital signal through a sampling-restoring formula. Accordingly, when the digital signal x[k] exists to infinity, the digital signal may be restored to the most ideal analog signal through the following Equation 3.

$$x(t) = \sum_{k=-\infty}^{\infty} x[kT_s] \frac{\sin\frac{\pi}{T_s}(t-kT_s)}{\frac{\pi}{T_s}(t-kT_s)}$$ [Equation 3]

In Equation 3, t represents a time, Ts represents a sampling cycle, and x[kTs] represents a digital signal. When the sampling cycle Ts is defined as 1, a graph may be the same as FIG. 8.

When a value of the digital signal is substituted to Equation 3, an analog signal x(t) may be restored.

For example, a prediction pixel between integer pixels may be calculated by using the restored analog signal x(t). A filter coefficient may be calculated by the following Equation 4 according to the number of referred integer pixels and a location of the prediction pixel.

$$x(\alpha) = \sum_{k=-(\frac{N}{2}-1)}^{\frac{N}{2}} x[k] \frac{\sin\pi(\alpha-k)}{\pi(\alpha-k)}$$ [Equation 4]

In Equation 4, α represents a location of the prediction pixel, and N represents the number of referred integer pixels.

For example, when the number of referred integer pixels is 8 (N=8), the filter coefficient may be calculated according to a location of the prediction pixel like the following Table.

TABLE 2

| α | Filter coefficient |
|---|---|
| 1/4 | {−0.0893, 0.1000, −0.1801, 0.9003, 0.3001, −0.1286, 0.0816, −0.0600} |
| 1/2 | {−0.0809, 0.1273, −0.2122, 0.6366, 0.6366, −0.2122, −0.1273, −0.0909} |
| 3/4 | {−0.0800, 0.0818, −0.1286, 0.3001, 0.9003, −0.1801, 0.1000, −0.0693} |

Since calculation complexity is high by a point operation, the filter coefficient is scaled and the integer filter coefficients may be calculated like the following Table 3.

TABLE 3

| α | Filter Coefficient |
|---|---|
| 1/4 | {−2, 4, −9, 58, 17, −8, 3, −1} |
| 1/2 | {−1, 4, −10. 39, 39, −10, 4, −1} |
| 3/4 | {−1, 3, −8, 17, 58, −9, 4, −2} |

By a similar method, all filter coefficients may be calculated according to values of α and N.

According to an embodiment of the present invention, when interpolation is performed, the number of tabs is selected by a method of improving performance by varying the number of filtering tabs which are used in horizontal and vertical interpolation through edge information of the video, and the number of tabs may be predicted by transmitting the selected tab number to decoding through signaling or performing decoding by using peripheral information.

As described above, the interpolation may have a large effect on performance by a method of finding a movement vector MV. Particularly, when the prediction is performed by accurate interpolation, the prediction exerts an influence on subsequent performance in subsequent transformation, quantization, scanning, and entropy encoding/decoding. That is, the accurate interpolation through interpolation exerts a very large influence on performance improvement of the entire codec.

The embodiment of the present invention is an interpolation method which causes improved performance to the entire encoding/decoding by varying the number of filtering tabs according to information depending on an edge direction of the video for a more efficient method than the existing interpolation.

Hereinafter, embodiments for a configuration which performs intra-prediction by adjusting the number of filtering tabs will be described in detail with reference to FIGS. 10 to 12.

Figure 10:
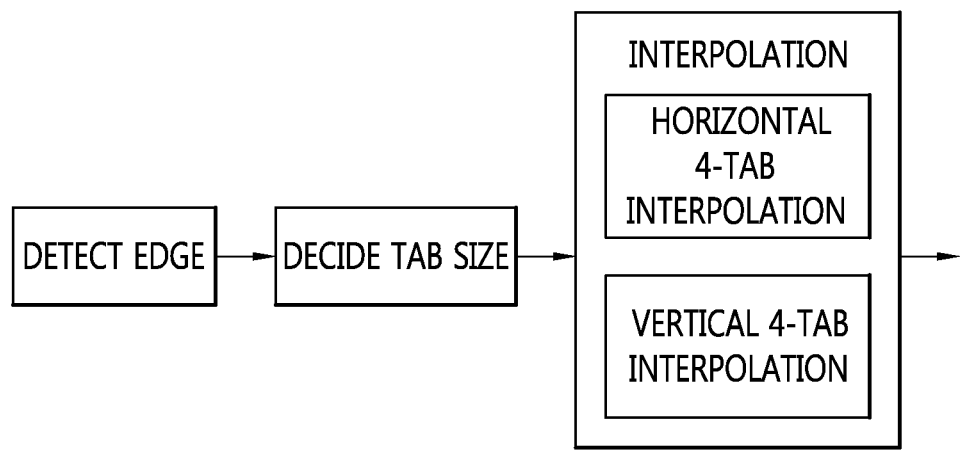
FIGS. 10 to 12 are block diagrams illustrating embodiments of a configuration that performs the intra prediction by adjusting the number of filtering tabs.

FIG. 10 is a diagram for describing an example for a method of determining the number of filtering tabs and illustrates a method of analyzing an edge of the video and determining the number of tabs in horizontal and vertical directions.

Referring to FIG. 10, after the edge of the video is analyzed and detected and a tab size (the number of tabs) of the filter is determined according to the detected edge, interpolation may be performed by using filters having different numbers of tabs in the vertical direction and the horizontal direction according to the determined tab number.

For example, as illustrated in FIG. 7, interpolation using a 4-tab filter is performed in the horizontal direction, and interpolation using an 8-tab filter may be performed in the vertical direction.

Here, the number of filtering tabs may be transmitted by signaling from the encoder to the decoder for performing decoding, and distinguished without signaling by using a predetermined characteristic.

Figure 11:
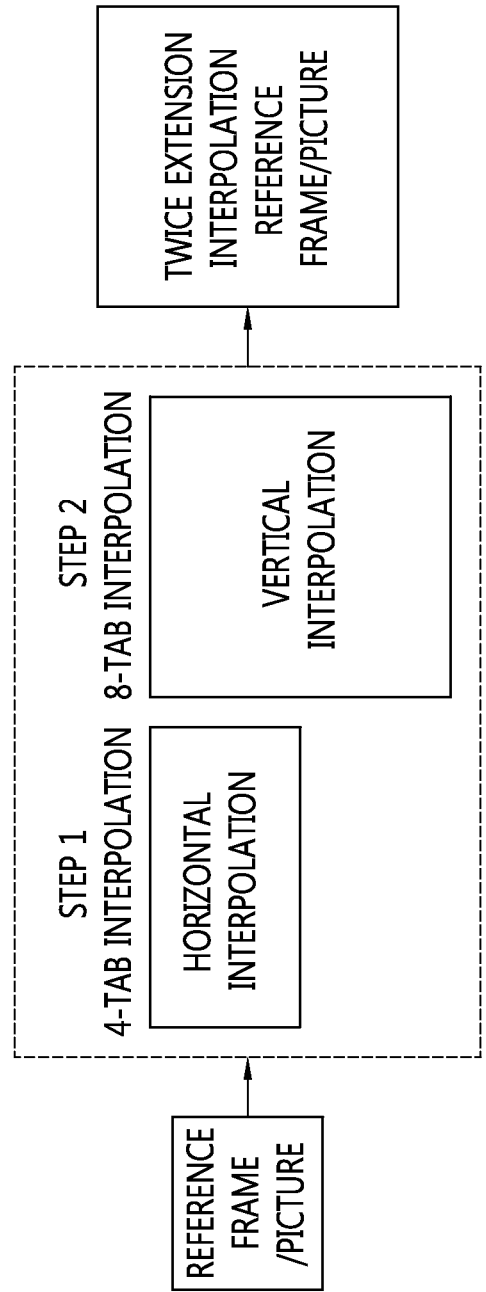

FIG. 11 illustrates an example of twice-extended interpolation using a 4-tab filter and an 8-tab filter and illustrates an example of ½ pixel-predicting a video used as reference as a frame or a picture.

The interpolation is performed by a tab size depending on horizontal and vertical edges as the size of the tab determined by the same method as described with reference to FIG. 10.

In step 1, pixel prediction may be performed through 4-tab filtering in the case of horizontal interpolation, and pixel prediction may be performed by using a 8-tab in the case of vertical interpolation.

The tab size of the present invention is not limited to the number and a method of configuring the tab size as an N-tab is included, and the coefficient of the tab may be applied regardless of horizontal and vertical sizes. The tab size may be differently applied according to an edge characteristic of the video.

Further, all methods of predicting the number of tabs by determining the tab size according to a size and a direction of the tab through signaling or a complex-determination method using an edge direction and a change (a change in MV, a change amount of the pixel, or the like) in video, and peripheral information without signaling are included.

Figure 12:
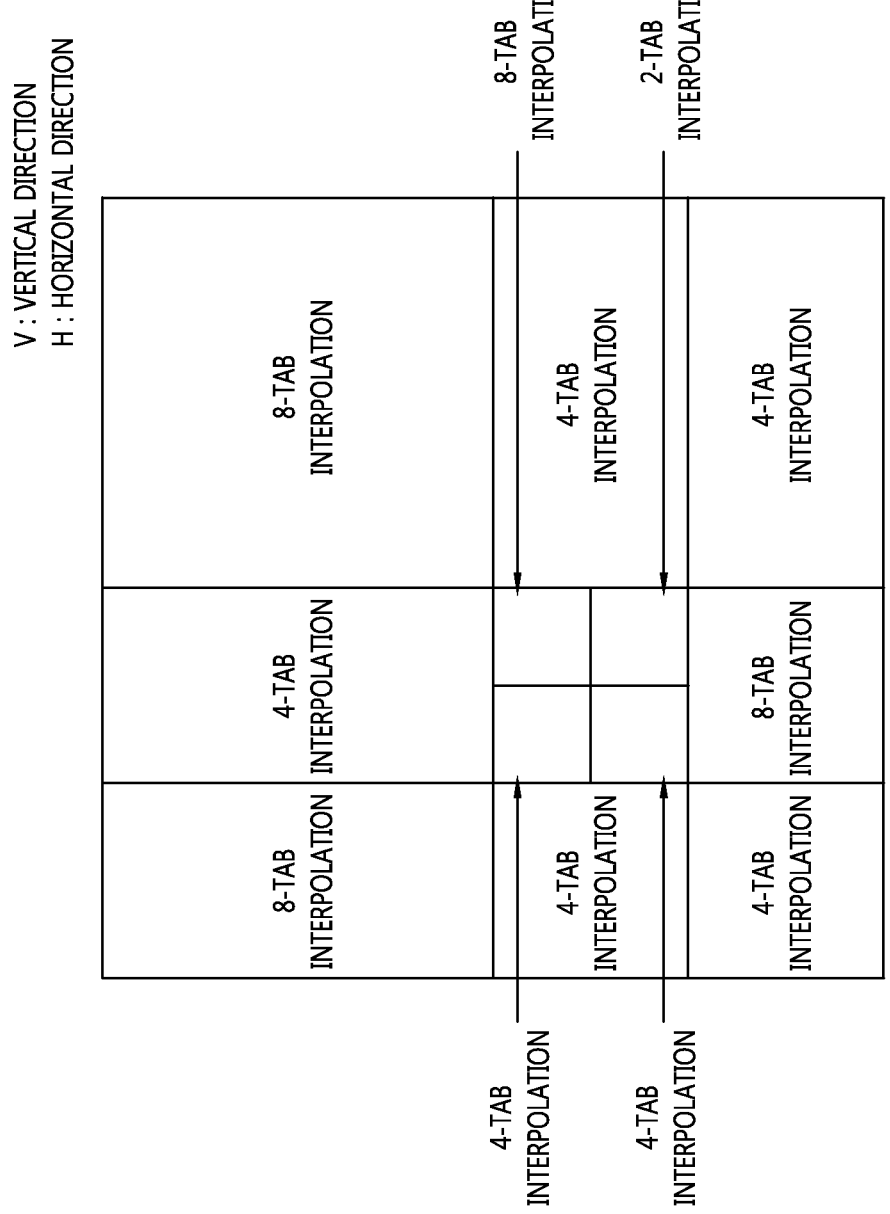

FIG. 12 illustrates an example in which various interpolation methods are applicable and is a diagram for describing various interpolation methods when four-time interpolation is applied.

Referring to FIG. 12, four interpolation methods may be applied in horizontal and vertical directions through a total of four steps.

As such, the present invention means an interpolation method in which one interpolation technique and N interpolation methods are adaptively changed according to a characteristic of the video and improved performance with the number of N-tabs, and includes both a decoding method without signaling according to a change in video and a decoding method through signaling in some cases.

Meanwhile, when the edge exists or the video is largely changed, using a small number of filtering tabs is an interpolation method which saves the edge, and when the change in pixel is small without the edge, it is efficient to us the number of filtering tabs.

For example, when a lot of edges are horizontally distributed, it is efficient that the number of tabs of horizontal filtering is increased and the number of tabs of vertical filtering is decreased. When a lot of edges are vertically distributed, it is efficient that the number of tabs of vertical filtering is increased and the number of tabs of horizontal filtering is decreased.

Alternatively, two methods are used, and a method of selecting a method having high performance through signaling is included.

In addition, in inter prediction, when prediction is performed by finding the MV, two-time interpolation means a prediction method at a location of ½ pixel, and four-time interpolation means a prediction method at a location of ¼ pixel.

According to another embodiment of the present invention, when interpolation is performed, improved performance may be caused by varying the number of filtering tabs which are used in interpolation for each region through a change in predetermined region in the video, a pixel change, or the like, and the number of tabs may be predicted by transferring the selected tab number to decoding through signaling or performing decoding by using peripheral information, while selecting the number of tabs.

For a more efficient method than the existing interpolation method, performance in the entire encoding/decoding may be improved by varying the number of filtering tabs according to a change in pixel value in a region or block unit.

For example, A-tab filtering is performed in the region of an object by detecting a predetermined object and B-tab filtering is performed in other regions, and as a result, the interpolation may be performed by varying a filtering coefficient adaptively depending on a change of pixels in a predetermined region or a predetermined unit or a change in adjacent pixels.

Figure 13:
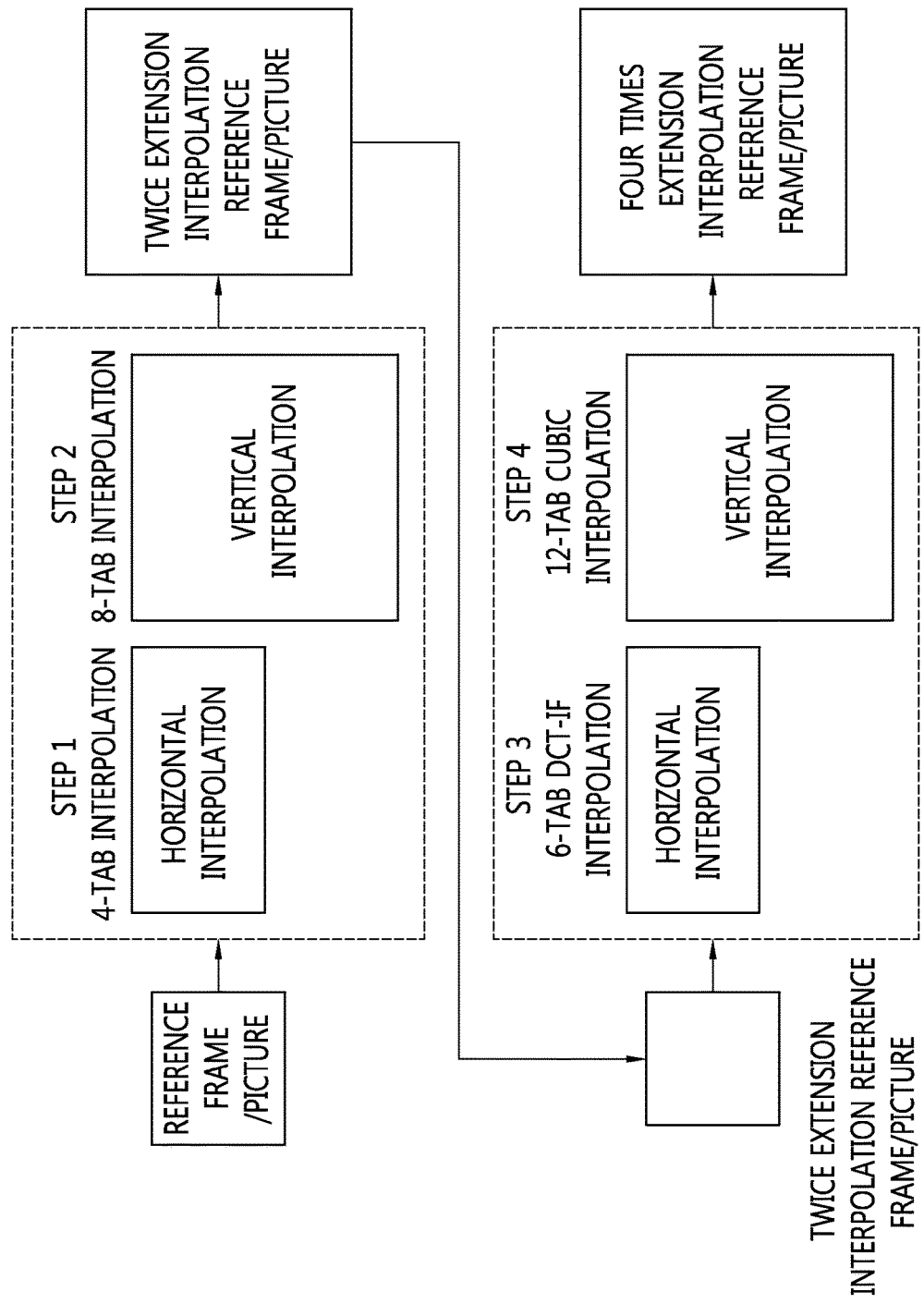
FIGS. 13 to 14 are block diagrams illustrating embodiments of a configuration that performs the intra prediction by adjusting the number of filtering tabs based on transform of a pixel value.
Figure 14:
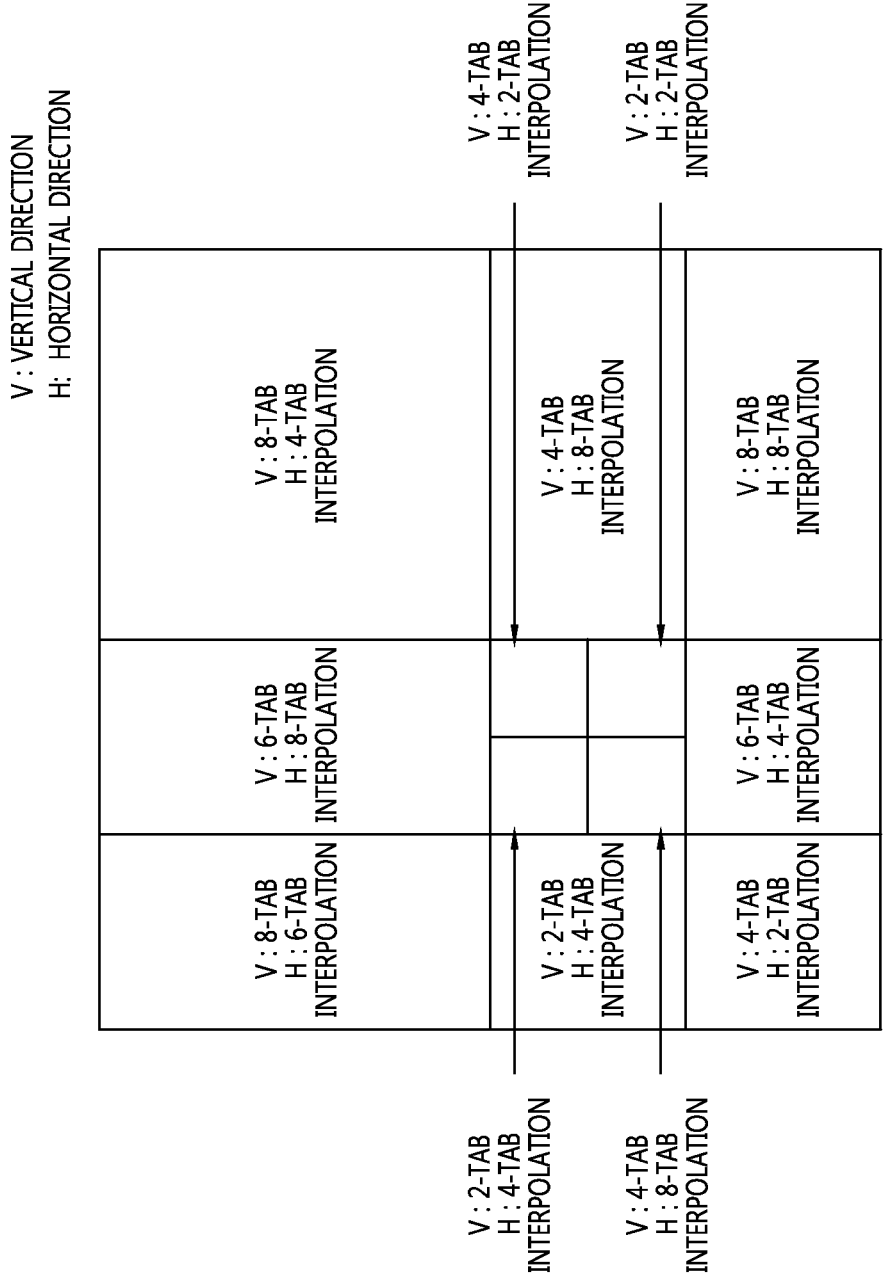

FIGS. 13 and 14 illustrate embodiments for a configuration of performing intra prediction by adjusting the number of filtering tabs depending on transformation of pixel values as block diagrams.

FIG. 13 illustrates an example for a method of varying tabs of the filter used in interpolation for each region in one frame.

Referring to FIG. 13, the number of tabs may be determined differently in various regions in one frame, and an interpolation method including all of interpolation methods with the various numbers of tabs, not the method of using the same number of tabs in one frame is included.

The determining of the number of tabs is an interpolation method by using the various numbers of tabs in one frame as illustrated in FIG. 10 through detection of the object, a change in pixel in a block (region) unit, or a change in adjacent blocks (regions).

Here, the number of tabs includes a method of signaling through decoding or the same decoding through a change in peripheral pixels and regions without signaling.

FIG. 14 illustrates an example of division of interpolation tabs for each region and division of vertical and horizontal tabs, and illustrates an example for a method of differently determining vertical and horizontal tabs through additional subdivision as compared with the case illustrated in FIG. 13.

Referring to FIG. 14, performance in the entire encoding/decoding may be improved by obtaining a pixel value which is optimally interpolated according to a characteristic of the video by changing the tab number for each region and changing a width and a length.

Here, the vertical and horizontal tabs and the tab for the region are a method including both a decoding method through signaling and a decoding method without signaling.

For example, when a lot of edges are distributed by dividing the region in one frame, a small number of filtering tabs is determined and used in order to maintain the edges, and it may be efficient to use many numbers of filtering tabs in the region without many edges.

In detail, in FIG. 13, a region using 8-tab interpolation is interpolated by using the number of filtering tabs in a region having a small number of edges, and in the case of 4-tab, the entire video may be interpolated by using a small number of filtering tabs in order to maintain the edges in a region where a lot of edges are distributed.

Further, in FIG. 14, as a method of varying the number of tabs according to the divided video, in detail, an edge direction as illustrated in FIG. 13, a method of varying the number of vertical and horizontal filtering tabs in each region is illustrated.

As described in FIGS. 10 to 12, the method of varying the number of vertical and horizontal filtering tabs may be applied.

Figure 15:
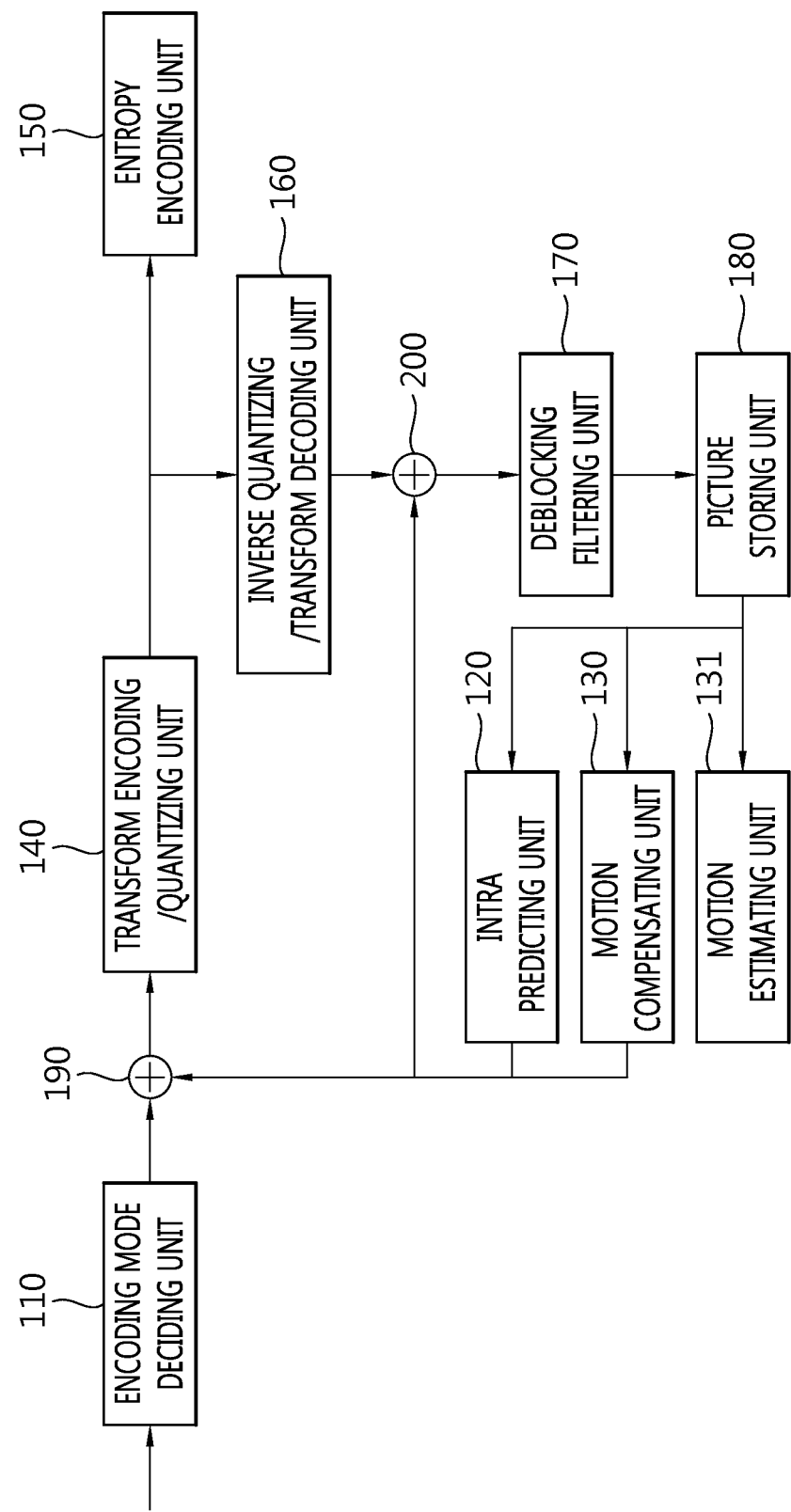
FIG. 15 is a block diagram illustrating a configuration of an encoding apparatus according to an embodiment of the present invention.

FIG. 15 is a diagram illustrating a configuration of an encoding apparatus according to an embodiment of the present invention.

In general, the encoding apparatus includes an encoding process and a decoding process and a decoding apparatus includes the decoding process. The decoding process of the decoding apparatus is similar to the decoding process of the encoding apparatus. Therefore, hereinafter, the encoding apparatus will be primarily described.

As illustrated in FIG. 15, the video encoding apparatus according to the embodiment of the present invention includes new various algorithms such as an encoding unit and an encoding structure, inter-screen prediction, intra-screen prediction, interpolation, filtering, a transform method, and the like.

Referring to FIG. 15, the video encoding apparatus includes an encoding mode deciding unit 110, an intra predicting unit 120, a motion compensating unit 130, a motion estimating unit 131, a transform encoding/quantizing unit 140, an entropy encoding unit 150, an inverse quantizing/transform decoding unit 160, a deblocking filtering unit 170, a picture storing unit 180 a subtracting unit 190, and an adding unit 200.

The encoding mode deciding unit 110 analyzes an input vide signal to segment a picture into encoding blocks having a predetermined size and decide an encoding mode for the segmented encoding blocks having the predetermined size. The encoding mode includes intra prediction encoding and inter prediction encoding.

The picture is constituted by multiple slices and the slice is constituted by multiple largest coding units (LCUs). The LCU may be segmented into multiple coding units (CUs) and an encoder may add information (flag) indicating the segmentation or not to a bitstream. The decoder may recognize the position of the LCU by using an address LcuAddr. A coding unit (CU) when the segmentation is not permitted may be regarded as a prediction unit (PU) and the decoder may recognize the position of the PU as a PU index.

The prediction unit (PU) may be divided into multiple partitions. Further, the prediction unit (PU0 may be constituted by multiple transform units (TUs).

The encoding mode deciding unit 110 transmits video data to the subtracting unit 190 by the unit (for example, a PU unit or a TU unit) of the blocks having the predetermined size according to the decided encoding mode.

The transform encoding/quantizing unit 140 transforms a residual block calculated by the subtracting unit 190 into a frequency domain from a space domain. For example, the residue block is transformed based on 2D discrete cosine transform (DCT) or discrete sine transform (DST).

Further, the transform encoding/quantizing unit 140 decides a quantization step size for quantizing a transform coefficient and quantizes the transform coefficient by using the decided quantization step size. A quantization matrix may be decided according to the decided quantization step size and the encoding mode.

The quantized 2D transform coefficient is transformed into a 1D quantization transform coefficient by one of predetermined scanning methods. A sequence of the transformed 1D quantization transform coefficients is provided to the entropy encoding unit 150.

The inverse quantizing/transform decoding unit 160 inversely quantizes a quantization coefficient quantized by the transform encoding/quantizing unit 140. Further, an inverse quantization coefficient acquired by the inverse quantization is inversely transformed. As a result, the residue block transformed into the frequency domain may be recovered into the residue block of the space domain.

The deblocking filtering unit 170 receives video data inversely quantized and inversely transformed from the inverse quantizing/transform encoding unit 160 to perform filtering for removing a blocking effect.

The picture storing unit 180 receives the filtered video data from the deblocking filtering unit 170 to recover and store a video by the unit of the picture. The picture may be a frame unit video or a field unit video. The picture storing unit 180 includes a buffer (not illustrated) that may store multiple pictures. The multiple pictures stored in the buffer are provided for an intra prediction and a motion estimation.

The pictures provided for the intra prediction or the motion estimation are called reference pictures.

The motion estimating unit 131 performs the motion estimation by receiving at least reference picture stored in the picture storing unit 180 to output motion data an index and a block mode representing the reference picture.

In order to optimize prediction precision, a motion vector is decided with decimal pixel precision, for example, ½ or ¼ pixel precision. Since the motion vector may have the decimal pixel precision, the motion compensating unit 130 applies an interpolation filter for calculating a pixel value a decimal pixel position to the reference picture to calculate the pixel value of the decimal pixel position from a pixel value of an integer pixel position.

The motion compensating unit 130 extracts and outputs a prediction block corresponding to a block to be encoded from the reference picture used for the motion estimation among the multiple reference pictures stored in the picture storing unit 180 according to the motion data input from the motion estimating unit 131.

The motion compensating unit 130 decides a filter feature of an adaptive interpolation filter required for the motion compensation of decimal precision. The filter feature may include, for example, information indicting a filter type the adaptive interpolation filter and information indicating the size of the adaptive interpolation filter.

The size of the filter is, for example, a tap number which is the number of the filter coefficients of the adaptive interpolation filter.

In detail, the motion compensating unit 130 as the adaptive interpolation filter may decide any one of separation type and non-separation type adaptive filters. Then, the decided tap number of the adaptive interpolation filter and a value of each filter coefficient are decided. The value of the filter coefficient may be decided differently for each relative position of the decimal pixel to the integer pixel. Further, the motion compensating unit 130 may use multiple non-adaptive interpolation filters in which the filter coefficient is fixed.

The motion compensation unit 130 may configure the feature of the interpolation filter by the predetermined processing unit. For example, the feature may be configured by the decimal pixel unit, the coding basic unit (coding unit), the slice unit, the picture unit, or the sequence unit. Further, one feature may be configured with respect to one video datum.

Therefore, within the predetermined processing unit, since the same filter feature is used, the motion compensating unit 130 includes a memory temporarily storing the filter feature. The memory stores the filter feature and the filter coefficient as necessary. For example, the motion compensating unit 130 may decide the filter feature every picture and decide the filter coefficient by the slice unit.

The motion compensating unit 130 receives the reference picture from the picture storing unit 180 and applies filter processing by using the decided adaptive interpolation filter to generate a prediction reference image with the decimal precision.

In addition, the motion compensation with the decimal pixel precision is performed based on the motion vector decided by the motion estimating unit 131 to generate the prediction block.

When an input block to be encoded is subjected to inter-picture prediction encoding, the subtracting unit 190 performs differential calculation with an input macro block by receiving the block in the reference picture, which corresponds to the input block from the motion compensating unit 130 to output a residue signal.

The intra predicting unit 120 performs the intra prediction encoding by using a reconfigured pixel value in the picture in which the prediction is performed. The intra predicting unit selects one of multiple predetermined intra prediction modes according to the size of a current block by receiving the current block to be prediction-encoded to perform the intra prediction. The intra predicting unit 120 decides the intra prediction mode of the current block by using previously encoded pixels adjacent to the current block and generates the prediction block corresponding to the decided mode.

A previously encoded region among regions included in a current picture is decoded again to be used by the intra predicting unit 120 again, and as a result the encoded region is stored in the picture storing unit 180. The intra predicting unit 120 generates the prediction block of the current block by using a pixel adjacent to the current block or pixels which are not adjacent to the current block, but are applicable in the previously encoded region of the current picture, which is stored in the picture storing unit 180.

The intra predicting unit 120 may adaptively filter the adjacent pixel in order to predict the intra block. Information for notifying filtering or not in the encoder may be transmitted for the same motion in the decoder. Alternatively, the filtering or not may be decided based on the intra prediction mode of the current block and the size information of the current block.

A prediction type used by the video encoding apparatus depends on whether the input block is encoded in the intra mode or the inter mode by the encoding mode deciding unit.

Switching the intra mode and the inter mode is controlled by an intra/inter switch.

The entropy encoding unit 150 entropy-encodes the quantization coefficient quantized by the transform encoding/quantizing unit 140 and the motion information generated by the motion estimating unit 131. Further, the intra prediction mode, control data (for example, the quantization step size, and the like), and the like may be encoded. In addition, the filter coefficient decided by the motion compensating unit 130 is also encoded and output as the bitstream.

As described above, the configuration of the video decoding apparatus according to the embodiment of the present invention may be derived from the configuration of the video encoding apparatus illustrated in FIG. 15 and for example, an inverse process to the encoding process described with reference to FIG. 15 to decode the video.

The method according to the present invention is prepared as a program to be executed in a computer to be stored in a computer-readable recording medium and an example of the computer readable medium may include a read only memory (ROM), a random access memory (RAM), a compact disk read only memory (CD-ROM), a magnetic tape, a floppy disk, an optical data storage, or the like, and also include a medium implemented in a form of a carrier wave (for example, transmission through the Internet).

The computer-readable recording media are distributed on computer systems connected through the network, and thus the computer-readable recording media may be stored and executed as the computer-readable code by a distribution scheme. Further, functional programs, codes, and code segments for implementing the method may be easily inferred by a programmer in a technical field to which the present invention belongs.

While the exemplary embodiments of the present invention have been illustrated and described above, the present invention is not limited to the aforementioned specific exemplary embodiments, various modifications may be made by a person with ordinary skill in the technical field to which the present invention pertains without departing from the subject matters of the present invention that are claimed in the claims, and these modifications should not be appreciated individually from the technical spirit or prospect of the present invention.

What is claimed is:

1. A method for decoding a bitstream using an intra prediction, the method comprising:
    determining an intra prediction mode of a current block; and
    generating a prediction pixel in the current block based on the intra prediction mode of the current block,
    wherein the prediction pixel in the current block is generated by performing an interpolation filter with N reference pixels including a plurality of continuous reference pixels when the intra prediction mode of the current block is a directional mode, and
    wherein the plurality of continuous reference pixels are variably determined based on a position indicated by the direction of the intra prediction mode of the current block.

2. The method of claim 1, wherein the interpolation filter is a discrete cosine transform (DCT)-based filter or a discrete sine transform (DST)-based filter having a number of tabs corresponding to a number of the reference pixels that is used.

3. The method of claim 2, wherein at least one of a type of a filter and the number of tabs is signaled.

4. The method of claim 3, wherein the number of tabs is decided based on an intra prediction mode.

5. The method of claim 4, wherein in the case where the reference pixels are arranged in a vertical direction and in the case where the reference pixels are arranged in a horizontal direction, the number of tabs is decided to be different.

6. The method of claim 1, wherein the interpolation filter is a sync interpolation filter.

7. The method of claim 2, further comprising:
    verifying edge information; and
    deciding the number of tabs based on the verified edge information.

8. The method of claim 7, wherein when an edge is present between the two continuous reference pixels, the number of tabs is decided to be smaller than that when the edge is not present between the two continuous reference pixels.

9. The method of claim 7, wherein when more edges are present in a horizontal direction than in a vertical direction, the number of horizontal filtering tabs is decided to be larger than the number of vertical filtering tabs.

10. The method of claim 1, further comprising:
    splitting a picture to be predicted into a plurality of regions;
    deciding a number of tabs applied to each of the plurality of regions,
    wherein in the generating of the prediction pixel by performing the interpolation filter, the interpolation filter is performed for each of the split regions.

11. The method of claim 10, wherein the number of tabs is decided according to at least one of the position of an object in the picture, a change in pixel value of a specific region, and a change in pixel value of a contiguous region.

12. The method of claim 11, wherein the number of tabs is differently applied to a first region corresponding to the position of the object and a remaining second region.

13. The method of claim 10, wherein the number of tabs is differently applied to any one of the plurality of split regions in the vertical direction and the horizontal direction.

14. A method for encoding a bitstream using an intra prediction, the method comprising:
    determining an intra prediction mode of a current block; and
    generating a prediction pixel in the current block based on the intra prediction mode of the current block,
    wherein the prediction pixel in the current block is generated by performing an interpolation filter with N reference pixels including a plurality of continuous reference pixels when the intra prediction mode of the current block is a directional mode, and
    wherein the plurality of continuous reference pixels are variably determined based on a position indicated by the direction of the intra prediction mode of the current block.

15. A non-transitory computer readable recording medium storing a bitstream used in a decoding apparatus,
    wherein the bitstream includes an intra prediction mode of a current block,
    wherein the intra prediction mode of the current block makes the decoding apparatus generate a prediction pixel in the current block,
    in the decoding apparatus, the prediction pixel in the current block is generated by performing an interpolation filter with N reference pixels including a plurality of continuous reference pixels when the intra prediction mode of the current block is a directional mode, and wherein the plurality of continuous reference pixels are variably determined based on a position indicated by the direction of the intra prediction mode of the current block.

* * * * *